United States Patent [19]

Kebo

[11] Patent Number: 4,989,962

[45] Date of Patent: Feb. 5, 1991

[54] DUAL BAND/DUAL FOV INFRARED TELESCOPE

[75] Inventor: Reynold S. Kebo, Los Angeles, Calif.

[73] Assignee: Hughes Aircraft Company, Los Angeles, Calif.

[21] Appl. No.: 264,714

[22] Filed: Oct. 31, 1988

[51] Int. Cl.[5] .................. G02B 23/00; G02B 15/00; G02B 15/24

[52] U.S. Cl. ................... 350/537; 350/1.2; 350/423; 350/463

[58] Field of Search .................. 350/1.1–1.4, 350/455, 415, 409–417, 422–427, 437, 438, 537–539, 500–505; 250/352, 330; 356/252

[56] References Cited

U.S. PATENT DOCUMENTS

| | | | |
|---|---|---|---|
| 3,941,923 | 3/1976 | Wheeler | 250/330 |
| 4,030,805 | 6/1977 | Rogers | 350/1.4 |
| 4,199,217 | 4/1980 | Rogers | 350/1.3 |
| 4,431,917 | 2/1984 | Gibbons | 250/352 |
| 4,494,819 | 1/1985 | Lidwell | 350/1.1 |
| 4,802,717 | 2/1989 | Kebo | 350/1.2 |
| 4,871,219 | 10/1989 | Cooper | 350/474 |

Primary Examiner—Bruce Y. Arnold
Assistant Examiner—Thong Nguyen
Attorney, Agent, or Firm—William J. Streeter; Wanda K. Denson-Low

[57] ABSTRACT

A dual field of view telescope for operating in both the medium infrared spectral band from 3.8 to 5 micrometers and the long infrared spectral band from 8 to 11.5 micrometers. The telescope includes an objective lens group A and an eyepiece lens group B. All of the lenses of each group are made of zinc sulfide, germanium or nonoxide chalcogenide glass. One of the lenses in the objective lens group is a negative germanium lens A3 which serves to correct for residual axial chromatic aberrations in both IR bands due to its different dispersion characteristics in these two bands.

11 Claims, 1 Drawing Sheet

DUAL BAND/DUAL FOV INFRARED TELESCOPE

BACKGROUND

1. Technical Field

This invention relates to optical devices, and more particularly, to telescopes capable of operating in the infrared frequency spectrum.

2. Discussion

There is a need for telescopes capable of operating over a wide band of infrared radiation. Two of the bands of particular interest are the medium infrared (IR) band having wavelengths of from 3.8 to 5.0 micrometers and the long IR band having wavelengths of from 8 to 11.5 micrometers. These two bands correspond to regions of high transmittance within the atmosphere. Such telescopes can be used with a forward-looking infrared (FLIR) scanner and imager systems. Other applications of such a telescope would include infrared search-track (IRST) sensors and dual-band, target-recognition systems.

Previously known dual-band or wide-band infrared telescope designs typically used toxic materials such as KRS-5 and $As_2S_3$ or exotic materials such as potassium bromide, CdTe, GaAs or CsI. It was heretofore believed that it was necessary to employ these hard-to-use materials in order to correct chromatic aberrations in both spectral bands.

SUMMARY OF THE INVENTION

It has been discovered that good performance can be achieved from a telescope operating over a wide band, in particular the aforementioned medium and long infrared spectral bands, by using a combination of lenses selected from the group of zinc sulfide, germanium and monoxide chalcogenide glass; wherein one lens in the objective lens group includes a negative germanium lens. These lens materials are much more readily coated and easily fabricated into optical elements than the other materials noted above. Germanium has unusual dispersion characteristics in the two different spectral bands. It is dispersive in the middle IR band but not very dispersive in the long IR band. As a result, it serves to correct the axial chromatic aberrations in both IR bands to very small residual values.

In the preferred embodiment, a dual field of view (FOV) telescope design is used to provide both narrow field of view (NFOV) and wide field of view (WFOV) modes of operation. The lenses in the field switch group are also preferably selected from the three previously identified materials.

BRIEF DESCRIPTION OF THE DRAWINGS

The various advantages of the present invention will become apparent to one skilled in the art after studying the following specification and by reviewing the drawings in which.

DESCRIPTION OF THE PREFERRED EMBODIMENT

Figure 1:
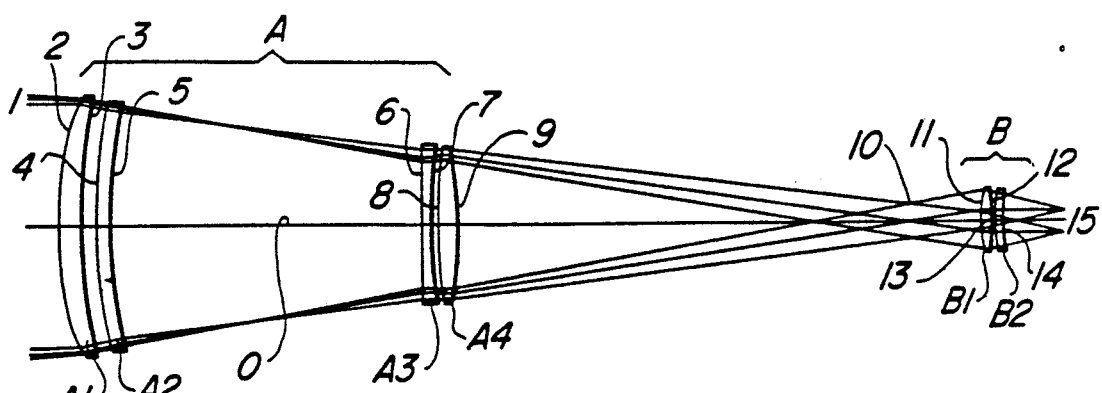
FIG. 1 is an optical diagram of a telescope made in accordance with the teachings of the present invention.

Turning now to FIG. 1, an afocal telescope capable of operating in the middle and long infrared bands is disclosed. As noted above, the middle or medium infrared band has radiation with wavelengths of from 3.8 to 5.0 micrometers. The long infrared band has radiation with wavelengths from 8–11.5 micrometers. The telescope of FIG. 1 includes two coacting groups of lenses located on the optical axis O of the telescope; an objective lens group A and an eyepiece lens group B. The objective lens group A serves to generate an intermediate image in front of the eyepiece group B which recollimates the infrared radiation.

All of the lenses in both groups are made of materials which are easy to fabricate and use when compared with the types of materials previously employed in wide IR band telescopes. The lenses are either monoxide chalcogenide glass, zinc sulfide or germanium. Although a variety of optical designs for the objective lens group A may be used, it appears necessary to employ a negative germanium lens in a rear doublet. The preferred design, as illustrated, provides excellent performance, with virtually no axial chromatic aberration in both spectral bands. In addition, it can be folded to occupy a small volume.

In the preferred embodiment, objective lens group A consists of four elements: A1, A2, A3 and A4. Lenses A1 and A2 comprise a front doublet while lenses A3 and A4 comprise a rear doublet. Lens A1 is a positive lens made of monoxide chalcogenide glass. For purposes of this invention, the term "monoxide chalcogenide glass" means an infrared transmitting glass formed from three element systems; one constituent from group IV-A (Si or Ge), a second constituent from group V-A (P, As or Sb) and third element, a chalcogenide from group IV (S, Se or Te) of the periodic table of elements. Examples of suitable monoxide chalcogenide glasses are those commercially available from Amorphous Materials, Inc. of Garland, Tex. under the trademark AMTIR-1 which is a Ge-As-Se infrared transmitting glass. The general properties of AMTIR-1 are set forth in the following Table I.

TABLE I

| GENERAL PROPERTIES OF AMTIR-1 | |
|---|---|
| COMPOSITION | Ge—As—Se GLASS |
| Density | 4.4 gms/cm$^3$ |
| Thermal Expansion | $12 \times 10^{-6}$/°C. |
| Hardness (Knoop) | 170 |
| Rupture Modulus | 2700 psi |
| Young's Modulus | $3.2 \times 10^6$ psi |
| Shear Modulus | $1.3 \times 10^6$ psi |
| Poisson's Ratio | 0.27 |
| Thermal Conductivity | $6. \times 10^{-4}$ cal/sec cm |
| Specific Heat | 0.07 cal/gm °C. |
| Upper Use Temp. | 300° C. |
| Resistivity | $2 \times 10^{12}$ Ω cm @ 100 Hz |
| Glass Transition Temp. | 405° C. |
| Annealing Temp. | 369° C. |

Other suitable monoxide chalcogenide glasses are TI20 (Ge—As—Se glass) and TI1173 (Ge—Sb—Se glass) available from Texas Instruments of Dallas, Texas and AMTIR-2 (Ge—Sb—Se glass) available from Amorphous Materials of Garland, Texas.

Lens A2 is a negative lens made of zinc sulfide. The purpose of lens A2 is to act as a dispersive element which partially corrects the chromatic aberrations introduced by the positive lens A1. In the rear doublet, lens A3 is a negative element made of germanium while the positive lens A4 is made of AMTIR-1. The general purpose of the rear doublet (lenses A3, A4) is to correct the residual axial chromatic aberrations introduced by the lenses A1, A2 and lenses B1 and B2. Germanium has a higher index of refraction value in the medium band than in the long infrared band and germanium has unusual dispersion characteristics in the medium and long infrared bands. It is dispersive in the medium band. Accordingly, lens A3 acts as a negative element with strong dispersion and high negative power in the medium band. However, it is not very dispersive in the long band and, accordingly, lens A3 acts as a negative element with weak dispersion and low negative power. Thus, germanium lens A3 serves to correct all of the residual axial chromatic aberrations to less than 30 microradians in object space in both bands in the narrow field of view mode of operation illustrated in FIG. 1. This results in diffraction-limited optical performance for a relatively large diameter pupil in both IR bands over the central portion of the field of view without refocusing.

The telescope of FIG. 1 is fabricated in accordance with the optical prescription given in the following Table II. The surface numbers in this table are those shown in FIG. 1. The figures for the radii and all other magnitudes are given in inches. The radius (RD) refers to the radius of curvature of the particular surface specified in accordance with conventional practice. The thickness (TH) refers to the distance along the optical axis 0 from the surface for which the thickness is stated to the next highest numbered surface. Thus, the thickness from surface 2 to surface 3 of lens A1 is 0.60 inch. All of the lens surfaces are spherical except for surface 2 of lens A1 which is a conic surface as defined in the table. The section labeled "Clear Apertures and Obstructions", according to conventional practice, refers to minimum clear apertures which is a parameter defining the diameter of the aperture which permits all radiation within the specified field of view to pass through the surface without vignetting. The other headings also refer to conventional design parameters and are well known to those skilled in the art. For example, "RN" refers to the refractive index, "DF" is the dispersion factor, and "CC" is the conic constant.

TABLE II

MEDIUM IR TELESCOPE (OBJECT TO IMAGE SPACE)

BASIC LENS DATA

| SURF | RD | TH | | MEDIUM | RN | DF | VNUM |
|---|---|---|---|---|---|---|---|
| 0 | 0.000000E + 00 | 0.100000E + 21 | | AIR | | | |
| 1 | 0.000000E + 00 | 1.00000 | | AIR | | | |
| 2* | 11.0122 | 0.600000 | GLASS | AMTIR1 | 2.513403 | 0.000 | 383.5 |
| 3 | 20.9366 | 0.500000 | | AIR | | | |
| 4 | 22.5667 | 0.250000 | GLASS | ZNS | 2.250708 | 0.000 | 185.3 |
| 5 | 15.2159 | 9.00000 | | AIR | | | |
| 6 | −65.3261 | 0.300000 | GLASS | GE | 4.022000 | 0.000 | 251.8 |
| 7 | 31.7944 | 0.200000 | | AIR | | | |
| 8 | 27.1454 | 0.400000 | GLASS | AMTIR1 | 2.513403 | 0.000 | 383.5 |
| 9 | −19.4016 | 13.1913 | | AIR | | | |
| 10 | 0.000000E + 00 | 2.11207 | | AIR | | | |
| 11 | 3.89848 | 0.200000 | GLASS | AMTIR1 | 2.513403 | 0.000 | 383.5 |
| 12 | −27.9081 | 0.200000 | | AIR | | | |
| 13 | 6.16544 | 0.200000 | GLASS | AMTIR1 | 2.513403 | 0.000 | 383.5 |
| 14 | 6.91250 | 1.85322 | | AIR | | | |
| 15 | 0.000000E + 00 | 0.000000E + 00 | | AIR | | | |
| 16 | 0.000000E + 00 | | | | | | |

REFRACTIVE INDICES

| SURF | N1 | N2 | N3 | N4 | N5 |
|---|---|---|---|---|---|
| 2 | 2.513403 | 2.514846 | 2.510900 | 0.000000 | 0.000000 |
| 4 | 2.250708 | 2.252859 | 2.246111 | 0.000000 | 0.000000 |
| 6 | 4.022000 | 4.027500 | 4.015500 | 0.000000 | 0.000000 |
| 8 | 2.513403 | 2.514846 | 2.510900 | 0.000000 | 0.000000 |
| 11 | 2.513403 | 2.514846 | 2.510900 | 0.000000 | 0.000000 |
| 13 | 2.513403 | 2.514846 | 2.510900 | 0.000000 | 0.000000 |

CC AND ASPHERIC DATA

| SURF | CC | AD | AE | AF | AG |
|---|---|---|---|---|---|
| 2 | −0.21575 | | | | |

CLEAR APERTURES AND OBSTRUCTIONS

| SURF | TYPE | CAY | CAX | YDEC | XDEC | TILT |
|---|---|---|---|---|---|---|
| 2 | CIRC | 3.7000 | | | | |
| 3 | CIRC | 3.7000 | | | | |
| 4 | CIRC | 3.5500 | | | | |
| 5 | CIRC | 3.5500 | | | | |
| 6 | CIRC | 2.2000 | | | | |
| 7 | CIRC | 2.2000 | | | | |
| 8 | CIRC | 2.2000 | | | | |
| 9 | CIRC | 2.2000 | | | | |
| 11 | CIRC | 1.0000 | | | | |
| 12 | CIRC | 1.0000 | | | | |
| 13 | CIRC | 1.0000 | | | | |
| 14 | CIRC | 1.0000 | | | | |

PICKUPS

| SURF | TYPE | J | A | B |
|---|---|---|---|---|

TABLE II-continued

| MEDIUM IR TELESCOPE (OBJECT TO IMAGE SPACE) | | | | |
|---|---|---|---|---|
| 8 | GLASS | 2 | 1.0000000 | 0.00000000E + 00 |
| 11 | GLASS | 2 | 1.0000000 | 0.00000000E + 00 |
| 13 | GLASS | 2 | 1.0000000 | 0.00000000E + 00 |

| REF OBJ Y-HT | REF AP Y-HT | OBJ SURF | REF SURF | IMG SURF | EVL SURF |
|---|---|---|---|---|---|
| −0.204232E + 19(1.17 DG) | −0.29731 | 0 | 15 | 16 | 16 |

| ER | EPR | A-MAG | LENGTH |
|---|---|---|---|
| 0.65746750E − 01 | −.29731381 | −11.774177 | 27.153373 |

NO APERTURE STOP.
EVALUATION MODE IS AFOCAL
PRIMARY CHROMATIC WAVELENGTHS ARE 2-3
SECONDARY CHROMATIC WAVELENGTHS ARE 2-1

| WAVL NBR | 1 | 2 | 3 | 4 | 5 |
|---|---|---|---|---|---|
| WAVELENGTH | 4.20000 | 3.80000 | 5.00000 | 0.00000 | 0.00000 |
| SPECTRAL WT | 1.0000 | 1.0000 | 1.0000 | 0.0000 | 0.0000 |

The telescope of FIG. 1 can be modified by inserting a field switch group C of lenses in the optical path O. The exact construction of the field switch lens group C is not critical to the practice of the broader teachings of this invention and can vary somewhat from that illustrated in FIG. 2. Whatever design is chosen, it should cooperate with the objective lens group A so that the focal point of the combination is less than that provided by the objective lens group A standing alone.

Figure 2:
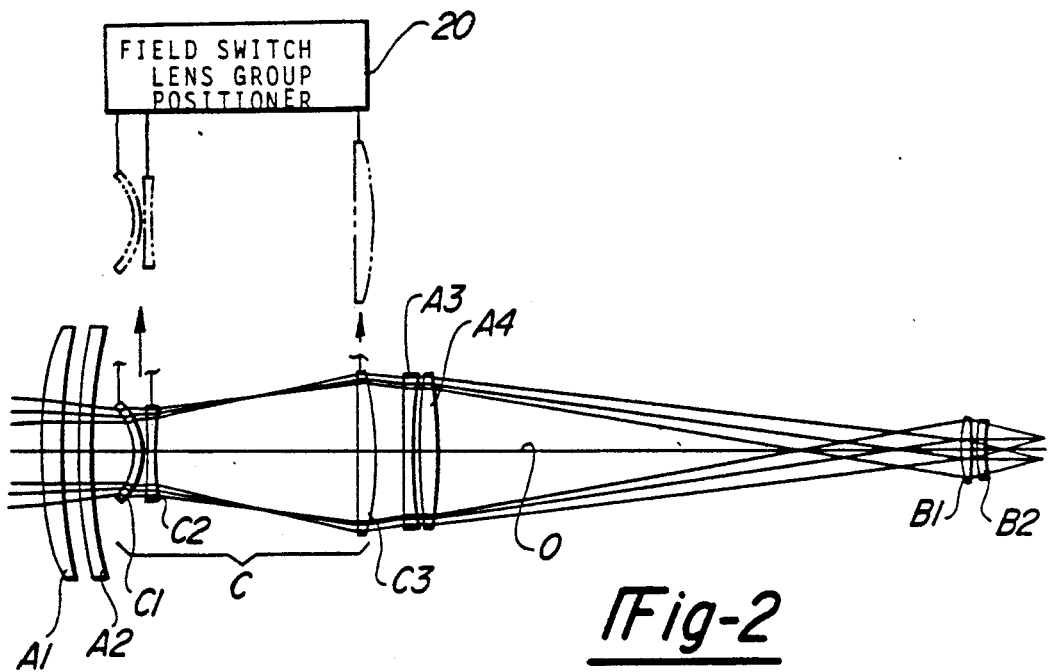
FIG. 2 is an optical diagram illustrating lenses of a field switch group being inserted into the optical path of the telescope of FIG. 1 to provide it with a wider field of view.

A suitable field switch group positioner mechanism 20 serves to place lenses C1, C2 and C3 into the optical path O as shown in FIG. 2 during a wide field of view mode of operation. The positioner 20 is used to remove the field switch lens group C to obtain the narrow field of view mode of operation of FIG. 1. The field switch lens group C of the preferred embodiment includes a front doublet consisting of lenses C1 and C2. Lens C1 is a negative AMTIR-1 lens while lens C2 is a negative zinc sulfide lens. This doublet is disposed adjacent to the front doublet of lenses A1, A2 of the objective lens group A. A positive AMTIR-1 lens C3 with a conic rear surface is disposed in front of the doublet A3, A4. The combination of the field switch lens group C and objective lens group A defines a focal length of about 8.07 inches as compared to a focal length of about 24.75 inches in the narrow field of view embodiment of FIG. 1.

The optical characteristics of the thus described dual-band/dual-FOV telescope are listed in the following Table III.

TABLE III

| OPTICAL CHARACTERISTICS OF THE DUAL-BAND/DUAL FOV TELESCOPE | | |
|---|---|---|
| PARAMETERS | NFOV | WFOV |
| Type of Optics | Refractive | Refractive |
| Entrance Pupil Dia., inches | 7.0 | 2.25 |
| Exit Pupil Dia., inches | 0.6 | 0.6 |
| Telescope Magnification | 11.77x | 3.88x |
| Field of View | | |
| Azimuth, degrees | 2.4 | 7.2 |
| Elevation, degrees | 1.8 | 5.4 |
| Spectral Bands, micrometers | 3.8 to 5.0 | 3.8 to 5.0 |
|  | 8.0 to 11.5 | 8.0 to 11.5 |

Those skilled in the art should now realize that the present invention provides significant advantages over the wide band IR telescopes known in the art. It should be further understood that while this invention was described in connection with a particular example, that no limitation is intended thereby except as defined in the following claims.

I claim:
1. A telescope for operating in both the medium infrared spectral band having radiation with wavelengths from 3.8 to 5 micrometers and in the long infrared spectral band having wavelengths from 8 to 11.5 micrometers, said telescope including an objective lens group and an eyepiece lens group on an optical axis, the improvement which comprises:
   said objective lens group consisting of a front doublet and a rear doublet displaced along the optical axis, the front doublet being defined by a positive chalcogenide lens and a negative zinc sulfide lens, the rear doublet being defined by a negative germanium lens and a positive chalcogenide lens; and
   said eyepiece lens group being defined by a doublet including two positive chalcogenide lenses.

2. The telescope of claim 1 wherein the front and rear doublets cooperate to generate an intermediate image at a given focal length in front of the eyepiece lens group.

3. The telescope of claim 2 which further comprises:
   means for positioning a field switch lens group on the optical axis of the telescope, said field switch lens group cooperating with the objective lens group to reduce the focal length of the combination of said field switch lens group and said objective lens group thereby providing the telescope with a wider field of view.

4. The telescope of claim 3 wherein the field switch lens group is disposed between the front and rear doublets of the objective lens group.

5. The telescope of claim 3 wherein the field switch lens group comprises at least one negative lens and a positive lens.

6. The telescope of claim 5 wherein the field switch lens group comprises:
   a doublet adjacent the front doublet of the objective lens group and a positive lens adjacent the rear doublet of the objective lens group.

7. The telescope of claim 6 wherein the doublet of the field switch lens group comprises a chalcogenide lens and a zinc sulfide lens.

8. The telescope of claim 7 wherein the positive lens in the field switch lens group comprises a chalcogenide lens.

9. A dual field of view telescope for operating in both the medium infrared spectral band having radiation with wavelengths from 3.8 to 5 micrometers radiation with and in the long infrared spectral band having wavelengths from 8 to 11.5 micrometers, said telescope including an objective lens group and an eyepiece lens group on an optical axis, the improvement which comprises:

said objective lens group including a front doublet and a rear doublet displaced along the optical axis, the front doublet being defined by a positive chalcogenide lens and a negative zinc sulfide lens, the rear doublet being defined by a negative germanium lens and a positive chalcogenide lens;

said eyepiece lens group being defined by a doublet including two positive chalcogenide lenses; and field switch lens group means having a plurality of lenses selected from the group of monoxide chalcogenide glass and zinc sulfide, said field switch group cooperating with the lenses of the objective lens group to shorten the focal length of the thereby providing a wider field of view for the telescope when the field switch lens group is placed on the optical axis.

10. The telescope of claim 9 wherein said field switch lens group comprises:

a doublet disposed adjacent the front doublet of the objective lens group, the lenses of the doublet being made of monoxide chalcogenide glass and zinc sulfide; and a positive lens with a conic rear surface disposed adjacent the rear doublet of the objective lens group.

11. The telescope of claim 10 wherein the lenses of the objective lens group and the eyepiece lens group are fabricated in accordance with the prescription table set forth below wherein the "radius" (RD) refers to the radius of curvature of the lens surface indicated by the corresponding number and the thickness (TH) refers to the distance along the optical axis O from the indicated surface to the surface of the next higher number:

| BASIC LENS DATA | | |
| --- | --- | --- |
| SURF | RD (Inches) | TH (Inches) |
| 0 | 0.000000E + 00 | 0.100000E + 21 |
| 1 | 0.000000E + 00 | 1.00000 |
| 2* | 11.0122 | 0.600000 |
| 3 | 20.9366 | 0.500000 |
| 4 | 22.5667 | 0.250000 |
| 5 | 15.2159 | 9.00000 |
| 6 | −65.3261 | 0.300000 |
| 7 | 31.7944 | 0.200000 |
| 8 | 27.1454 | 0.400000 |
| 9 | −19.4016 | 13.1913 |
| 10 | 0.000000E + 00 | 2.11207 |
| 11 | 3.89848 | 0.200000 |
| 12 | −27.9081 | 0.200000 |
| 13 | 6.16544 | 0.200000 |
| 14 | 6.91250 | 1.85322 |
| 15 | 0.000000E + 00 | 0.000000E + 00 |
| 16 | 0.000000E + 00 | | wherein the surface 2* is a conic surface.

* * * * *

UNITED STATES PATENT AND TRADEMARK OFFICE
CERTIFICATE OF CORRECTION

PATENT NO. : 4,989,962
DATED : February 5, 1991
INVENTOR(S) : REYNOLD S. KEBO It is certified that error appears in the above-identified patent and that said Letters Patent is hereby corrected as shown below:

On the title page, ABSTRACT, line 7, delete "nonoxide" and substitute therefor --monoxide--.

Column 6, line 68, and Column 7, line 1 (Claim 9), "radiation with" should be deleted and inserted after the word "having", which appears at Column 7, line 1.

Column 7, line 22 (Claim 9), after the word "the", second occurrence, insert --combination of said field switch lens group and said objective lens group--.

Signed and Sealed this

Twenty-third Day of February, 1993

*Attest:*

STEPHEN G. KUNIN

*Attesting Officer*   Acting Commissioner of Patents and Trademarks